United States Patent
Lee et al.

(10) Patent No.: US 9,785,296 B2
(45) Date of Patent: Oct. 10, 2017

(54) FORCE ENHANCED INPUT DEVICE WITH SHIELDED ELECTRODES

(71) Applicant: Synaptics Incorporated, San Jose, CA (US)

(72) Inventors: Wei-Lung Lee, Taipei (TW); Pei-Che Chiu, Taipei (TW)

(73) Assignee: Synaptics Incorporated, San Jose, CA (US)

(*) Notice: Subject to any disclaimer, the term of this patent is extended or adjusted under 35 U.S.C. 154(b) by 196 days.

(21) Appl. No.: 14/675,606

(22) Filed: Mar. 31, 2015

(65) Prior Publication Data

US 2016/0291719 A1    Oct. 6, 2016

(51) Int. Cl.
G06F 3/041    (2006.01)
G06F 3/044    (2006.01)

(52) U.S. Cl.
CPC ............ G06F 3/044 (2013.01); G06F 3/0414 (2013.01); *G06F 2203/04108* (2013.01)

(58) Field of Classification Search
CPC .................. G06F 3/044; G06F 3/0414; G06F 2203/04108; G06F 2203/04107; G06F 2203/04106; G06F 2203/04105; G06F 2203/04112; G06F 2203/04104
See application file for complete search history.

(56) References Cited

U.S. PATENT DOCUMENTS

| | | | |
|---|---|---|---|
| 5,510,813 A | 4/1996 | Makinwa et al. | |
| 5,942,733 A | 8/1999 | Allen et al. | |
| 5,943,044 A | 8/1999 | Martinelli et al. | |
| 6,002,389 A | 12/1999 | Kasser | |
| 7,154,481 B2 | 12/2006 | Cross et al. | |
| 7,215,329 B2 | 5/2007 | Yoshikawa et al. | |
| 7,395,717 B2 | 7/2008 | DeAngelis et al. | |
| 7,538,760 B2 | 5/2009 | Hotelling et al. | |
| 8,063,886 B2 | 11/2011 | Serban et al. | |
| 8,627,716 B2 | 1/2014 | Son | |
| 8,730,199 B2 | 5/2014 | Sleeman et al. | |
| 8,857,274 B2 | 10/2014 | Mamigonians | |
| 2004/0090429 A1 | 5/2004 | Geaghan et al. | |
| 2006/0260417 A1 | 11/2006 | Son et al. | |
| 2007/0229464 A1 | 10/2007 | Hotelling et al. | |
| 2007/0236466 A1 | 10/2007 | Hotelling | |
| 2008/0174321 A1* | 7/2008 | Kang ...................... | G06F 3/044 324/686 |
| 2010/0242629 A1 | 9/2010 | Leuenberger et al. | |
| 2010/0253651 A1 | 10/2010 | Day | |

(Continued)

*Primary Examiner* — Patrick Edouard
*Assistant Examiner* — Joseph Fox
(74) *Attorney, Agent, or Firm* — Osha Liang LLP

(57) ABSTRACT

An input device includes an input surface and a first substrate mechanically coupled to the input surface. The first substrate includes a first plurality of sensor electrodes configured to detect an input force applied by an input object to the input surface. The input device further includes a conductive material disposed between the input surface and the first plurality of sensor electrodes. The conductive material shields the first plurality of sensor electrodes from effects of the input object in a sensing region of the input device. The input device further includes a second substrate mechanically coupled to the first substrate. The second substrate includes a second plurality of sensor electrodes configured to detect a location of an input object at the input surface.

16 Claims, 6 Drawing Sheets

(56) References Cited

U.S. PATENT DOCUMENTS

| | | |
|---|---|---|
| 2012/2025876 | 10/2010 | Day |
| 2010/0282000 A1 | 11/2010 | Gorjanc et al. |
| 2011/0096025 A1 | 4/2011 | Slobodin et al. |
| 2011/0141053 A1 | 6/2011 | Bulea et al. |
| 2011/0227872 A1 | 9/2011 | Huska et al. |
| 2011/0278078 A1 | 11/2011 | Schediwy et al. |
| 2012/0013573 A1 | 1/2012 | Liu et al. |
| 2012/0026124 A1 | 2/2012 | Li et al. |
| 2012/0038583 A1 | 2/2012 | Westhues et al. |
| 2012/0062245 A1 | 3/2012 | Bao et al. |
| 2012/0105367 A1 | 5/2012 | Son et al. |
| 2013/0047747 A1* | 2/2013 | Joung .................. G01L 1/142 73/862.68 |
| 2014/0085254 A1* | 3/2014 | Tenuta ................. G06F 3/0414 345/174 |
| 2014/0238152 A1* | 8/2014 | Kallassi ............. G01R 27/2605 73/862.626 |
| 2015/0130742 A1 | 5/2015 | Chen et al. |

\* cited by examiner

FORCE ENHANCED INPUT DEVICE WITH SHIELDED ELECTRODES

FIELD

This invention generally relates to electronic devices.

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

In general, in one aspect, embodiments relate to an input device. The input device includes an input surface and a first substrate mechanically coupled to the input surface. The first substrate includes a first plurality of sensor electrodes configured to detect an input force applied by an input object to the input surface. The input device further includes a conductive material disposed between the input surface and the first plurality of sensor electrodes. The conductive material shields the first plurality of sensor electrodes from effects of the input object in a sensing region of the input device. The input device further includes a second substrate mechanically coupled to the first substrate. The second substrate includes a second plurality of sensor electrodes configured to detect a location of an input object at the input surface.

In general, in one aspect, embodiments relate to a processing system for an input device. The input device includes an input surface, a first substrate, and a second substrate. The first substrate includes a first plurality of sensor electrodes, and the second substrate includes a second plurality of sensor electrodes. The processing system includes a sensor module configured to receive a first resulting signal associated with the first plurality of sensor electrodes. The sensor module is further configured to receive a second resulting signal associated with the second plurality of sensor electrodes. The second plurality of sensor electrodes includes a first subset of sensor electrodes and a second subset of sensor electrodes. The processing system further includes a determination module configured to determine force information applied by an input object to the input surface based on the first resulting signal. The first resulting signal is based on a change in a first variable capacitance formed between the first subset of sensor electrodes and the first plurality of sensor electrodes. The determination module is further configured to determine positional information of the input object in a sensing region of the input device based on a second resulting signal. The second resulting signal is based on a change in a second variable capacitance formed between the first subset and the second subset of sensor electrodes. The input device further includes a conductive material disposed between the input surface and the first plurality of sensor electrodes.

In general, in one aspect, embodiments relate to a method for manufacturing an input device. The method includes providing a first substrate. The first substrate may include a first plurality of sensor electrodes. The method further includes disposing a second substrate on or above the first substrate. The second substrate includes a second plurality of sensor electrodes and a conductive material. The method further includes disposing an input surface on or above the second substrate. The first plurality of sensor electrodes is configured to detect a location of an input object at the input surface. The second plurality of sensor electrodes is configured to detect an input force applied by the input object to the input surface. The conductive material shields the second plurality of sensor electrodes from effects of the input object on or above the input surface.

Other aspects of the invention will be apparent from the following description and the appended claims.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments provide input devices and methods that facilitate improved usability. In particular, one or more embodiments are directed to an input device that includes conductive material that shields a first set of sensor electrodes from effects of an input object on or above an input surface. The first set of sensor electrodes may be configured to detect an input force applied by the input object to the input surface. The input device may further include a second set of sensor electrodes configured to detect the location of the input object at the input surface.

Figure 1:
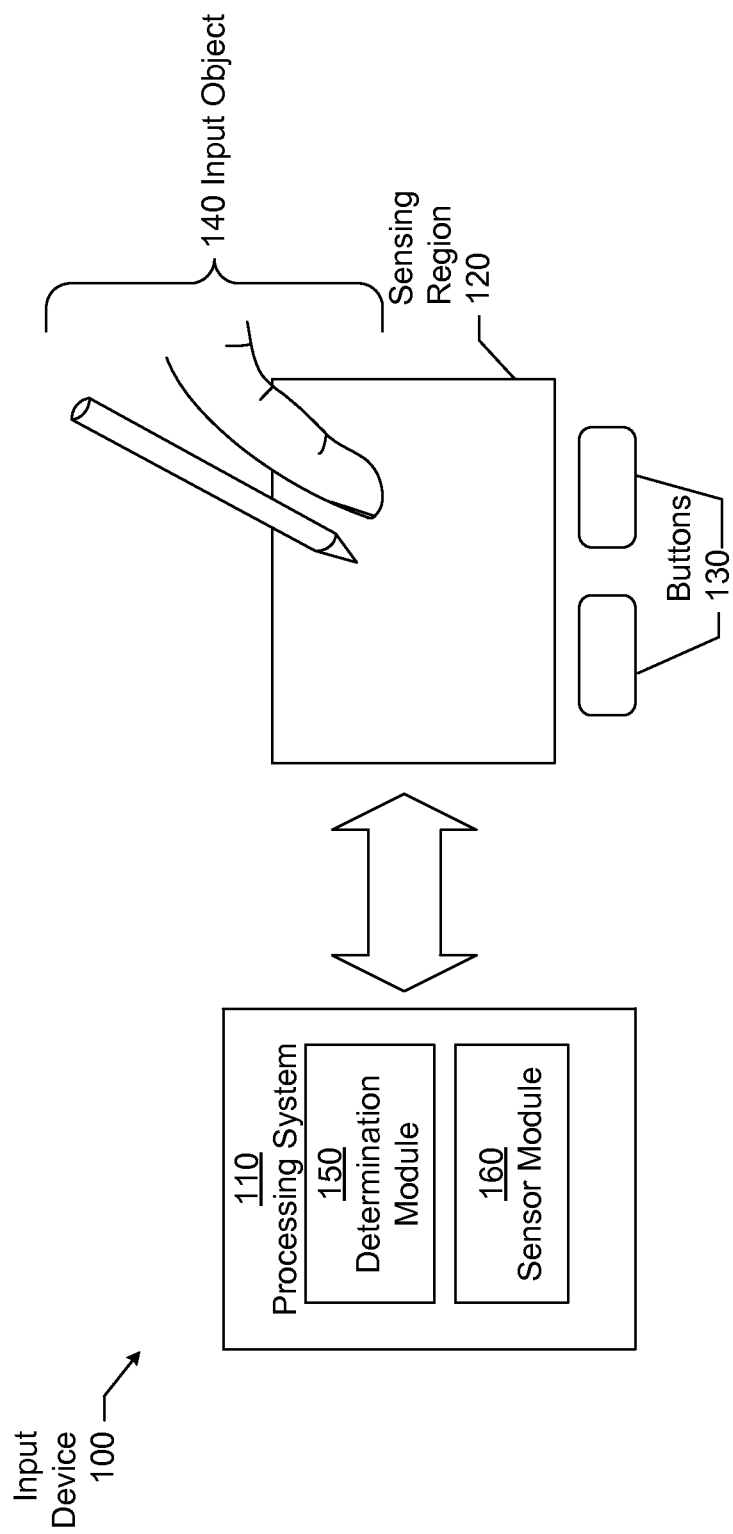
FIG. 1 shows a block diagram in accordance with one or more embodiments.

Turning now to the figures, FIG. 1 is a block diagram of an exemplary input device (100), in accordance with embodiments of the invention. The input device (100) may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device (100) and separate joysticks or key switches. Further example electronic systems include peripherals, such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device (100) may be implemented as a physical part of the electronic system, or may be physically separate from the electronic system. Further, portions of the input device (100) are part of the electronic system. For example, all or part of the determination module may be implemented in the device driver of the electronic system. As appropriate, the input device (100) may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, the input device (100) is shown as a proximity sensor device (also often referred to as a "touchpad" or a "touch sensor device") configured to sense input provided by one or more input objects (140) in a sensing region (120). Example input objects include fingers and styli, as shown in FIG. 1. Throughout the specification, the singular form of input object is used. Although the singular form is used, multiple input objects exist in the sensing region (120). Further, which particular input objects are in the sensing region may change over the course of one or more gestures. For example, a first input object may be in the sensing region to perform the first gesture, subsequently, the first input object and a second input object may be in the above surface sensing region, and, finally, a third input object may perform the second gesture. To avoid unnecessarily complicating the description, the singular form of input object is used and refers to all of the above variations.

The sensing region (120) encompasses any space above, around, in and/or near the input device (100) in which the input device (100) is able to detect user input (e.g., user input provided by one or more input objects (140)). The sizes, shapes, and locations of particular sensing regions may vary widely from embodiment to embodiment.

In some embodiments, the sensing region (120) extends from a surface of the input device (100) in one or more directions into space until signal-to-noise ratios prevent sufficiently accurate object detection. The extension above the surface of the input device may be referred to as the above surface sensing region. The distance to which this sensing region (120) extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device (100), contact with an input surface (e.g. a touch surface) of the input device (100), contact with an input surface of the input device (100) coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region (120) has a rectangular shape when projected onto an input surface of the input device (100).

The input device (100) may utilize any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes. Further, some implementations may be configured to provide a combination of one or more images and one or more projections.

In some resistive implementations of the input device (100), a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device (100), one or more sensing elements pick up loop currents induced by a resonating coil or pair of coils. Some combination of the magnitude, phase, and frequency of the currents may then be used to determine positional information.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. The reference voltage may by a substantially constant voltage or a varying voltage and in various embodiments; the reference voltage may be system ground. Measurements acquired using absolute capacitance sensing methods may be referred to as absolute capacitive measurements.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter") and one or more receiver sensor electrodes (also "receiver electrodes" or "receiver"). Transmitter sensor electrodes may be modulated relative to a reference voltage (e.g., system ground) to transmit transmitter signals (also called "sensing signal"). Receiver sensor electrodes may be held substantially constant relative to the reference voltage to facilitate receipt of resulting signals. The reference voltage may by a substantially constant voltage and in various embodiments; the reference voltage may be system ground. In some embodiments, transmitter sensor electrodes may both be modulated. The transmitter electrodes are modulated relative to the receiver electrodes to transmit transmitter signals and to facilitate receipt of resulting signals. A resulting signal may include effect(s) corresponding to one or more transmitter signals, and/or to one or more sources of environmental interference (e.g. other electromagnetic signals). The effect(s) may be the transmitter signal, a change in the transmitter signal caused by one or more input objects and/or environmental interference, or other such effects. Sensor electrodes may be dedicated transmitters or receivers, or may be configured to both transmit and receive. Measurements acquired using mutual capacitance sensing methods may be referred to as mutual capacitance measurements.

Further, the sensor electrodes may be of varying shapes and/or sizes. The same shapes and/or sizes of sensor electrodes may or may not be in the same groups. For example, in some embodiments, receiver electrodes may be of the same shapes and/or sizes while, in other embodiments, receiver electrodes may be varying shapes and/or sizes.

In FIG. 1, a processing system (110) is shown as part of the input device (100). The processing system (110) is configured to operate the hardware of the input device (100) to detect input in the sensing region (120). The processing system (110) includes parts of or all of one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. In one more embodiments, a processing system for a combined mutual and absolute capacitance sensor device may include any combination of the above described mutual and absolute capacitance circuitry. In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens, driving haptic actuators, etc.

The processing system (110) may be implemented as a set of modules that handle different functions of the processing system (110). Each module may include circuitry that is a part of the processing system (110), firmware, software, or a combination thereof. In various embodiments, different combinations of modules may be used. For example, as shown in FIG. 1, the processing system (110) may include a determination module (150) and a sensor module (160). The determination module (150) may include functionality to determine when at least one input object is in a sensing region, determine signal to noise ratio, determine positional information of an input object, identify a gesture, determine an action to perform based on the gesture, a combination of gestures or other information, and/or perform other operations.

The sensor module (160) may include functionality to drive the sensing elements to transmit transmitter signals and receive the resulting signals. For example, the sensor module (160) may include sensory circuitry that is coupled to the sensing elements. The sensor module (160) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

Although FIG. 1 shows a determination module (150) and a sensor module (160), alternative or additional modules may exist in accordance with one or more embodiments of the invention. Such alternative or additional modules may correspond to distinct modules or sub-modules than one or more of the modules discussed above. Example alternative or additional modules include hardware operation modules for operating hardware such as sensor electrodes and display screens, data processing modules for processing data such as sensor signals and positional information, reporting modules for reporting information, and identification modules configured to identify gestures, such as mode changing gestures, and mode changing modules for changing operation modes. Further, the various modules may be combined in separate integrated circuits. For example, a first module may be comprised at least partially within a first integrated circuit and a separate module may be comprised at least partially within a second integrated circuit. Further, portions of a single module may span multiple integrated circuits. In some embodiments, the processing system as a whole may perform the operations of the various modules.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. As yet further examples, the processing system (110) may determine positional information, determine force information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

"Force information" as used herein is intended to broadly encompass force information regardless of format. For example, the force information may be provided for each object as a vector or scalar quantity. As another example, the force information may be provided as an indication that determined force has or has not crossed a threshold amount. As other examples, the force information can also include time history components used for gesture recognition. As will be described in greater detail below, positional information and force information from the processing systems may be used to facilitate a full range of interface inputs, including use of the proximity sensor device as a pointing device for selection, cursor control, scrolling, and other functions.

In some embodiments, the input device (100) is implemented with additional input components that are operated by the processing system (110) or by some other processing system. These additional input components may provide redundant functionality for input in the sensing region (120), or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active area of a display screen. For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. In various embodiments, one or more display electrodes of a display device may be configured for both display updating and input sensing. As another example, the display screen may be operated in part or in total by the processing system (110).

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media that is readable by the processing system (110)). Additionally, the embodiments of the present invention apply equally regardless of the particular type of medium used to carry out the distribution. For example, software instructions in the form of computer readable program code to perform embodiments of the invention may be stored, in whole or in part, temporarily or permanently, on a non-transitory computer readable storage medium. Examples of non-transitory, electronically readable media include various discs, physical memory, memory, memory sticks, memory cards, memory modules, and or any other computer readable storage medium. Electronically readable media may be based on flash, optical, magnetic, holographic, or any other storage technology.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores, or micro-cores of a processor. Further, one or more elements of one or more embodiments may be located at a remote location and connected to the other elements over a network. Further, embodiments of the invention may be implemented on a distributed system having several nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While FIG. 1 shows a configuration of components, other configurations may be used without departing from the scope of the invention. For example, various components may be combined to create a single component. As another example, the functionality performed by a single component may be performed by two or more components.

Figure 2A:
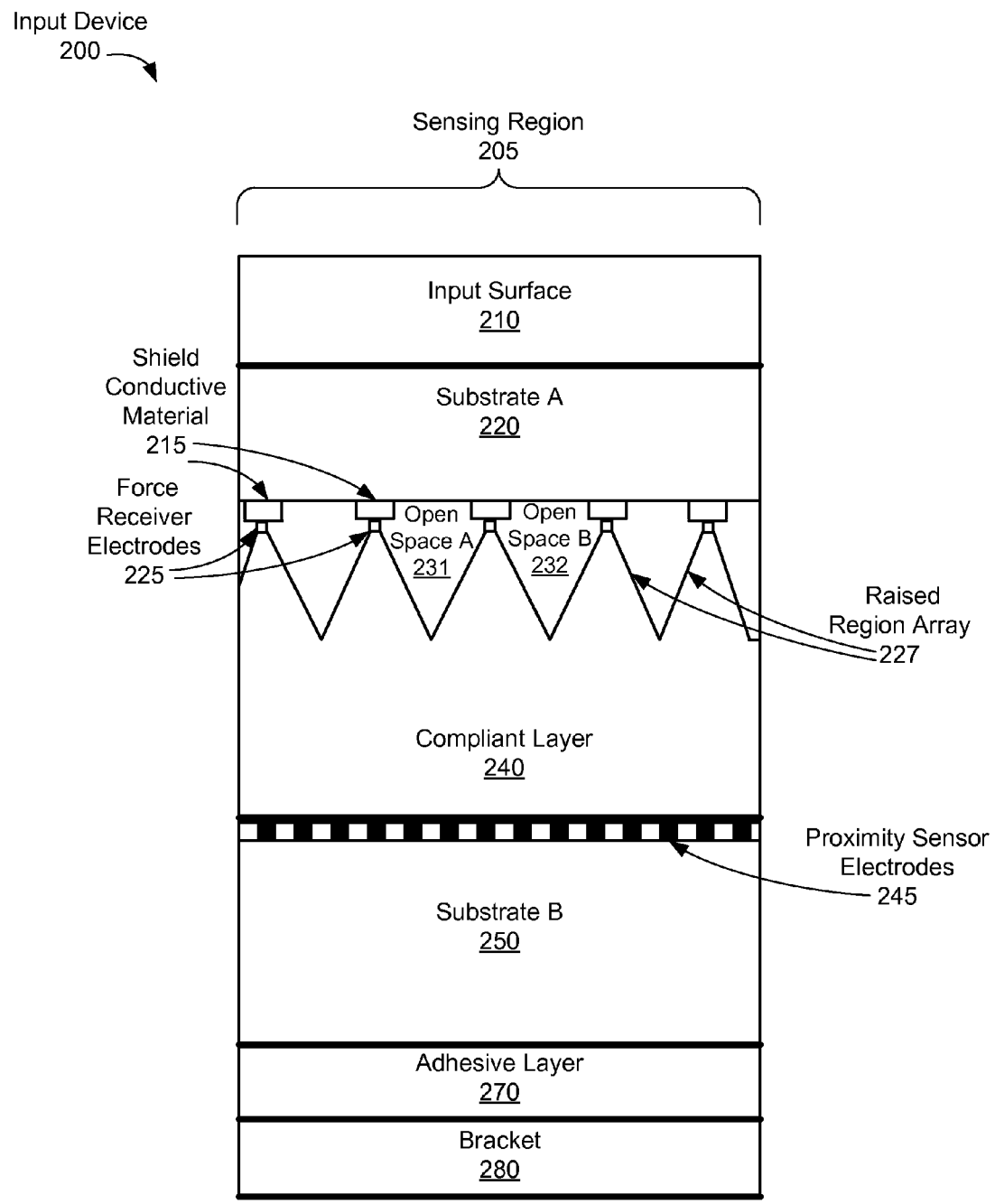
FIG. 2A shows a cross-sectional diagram in accordance with one or more embodiments.

Turning to FIG. 2A, FIG. 2A shows a cross-sectional diagram in accordance with one or more embodiments. As shown in FIG. 2A, an input device (200) may include an input surface (210), one or more substrates (e.g., substrate A (220), substrate B (250)), a compliant layer (240), an adhesive layer (270), and a bracket (280). On or above the input surface may be a sensing region (205). In one or more embodiments, the input device (200) includes various proximity sensor electrodes (245) for detecting the presence of an input object (not shown) in the sensing region (205). In one or more embodiments, the input device (200) includes various force receiver electrodes (225) for detecting an applied force by the input object to the input surface (210). In one or more embodiments, the input device (200) includes conductive material (215) that shields the force receiver electrodes from effects of the input object in the sensing region (205). In one or more embodiments, in response to an input force being applied by an input object to the input surface, substrate A (220), the compliant layer, and/or the input surface (210) are configured to locally deform.

The bracket (280) may be a fixed structure for providing mechanical support for the input device (200). The adhesive layer (270) may be an adhesive substance applied to a surface of the bracket (280) to bond the bracket (280) to the substrate B (250). As such, the bracket (280) may be configured as a stiffener for the input device (200).

In one or more embodiments, the proximity sensor electrodes (245) provide positional information of an input object in the sensing region (205). For example, the proximity sensor electrodes (245) may include transmitter electrodes and receiver electrodes as described with respect to FIG. 1. As such, the proximity sensor electrodes (245) may capacitively couple to form various areas of variable capacitance. For example, a processing system may obtain various resulting signals based on the changes in the variable capacitance caused by the presence of an input object. As such, the processing system may obtain positional information regarding the input object from the resulting signals.

In one or more embodiments, the force receiver electrodes (225) detect changes in capacitance resulting from forces applied to the input surface (210), e.g., by an input object. In one or more embodiments, for example, the force receiver electrodes (225) capacitively couple with some of the proximity sensor electrodes (245). The force receiver electrodes (225) form various areas of variable capacitance between the force receiver electrodes (225) and some of the proximity sensor electrodes (245). By applying force to the input surface (210), the force receiver electrodes (225) may deflect towards the proximity sensor electrodes (245), changing the distance between the proximity sensor electrodes and the force receiver electrodes (225), and thus changing the variable capacitance. The magnitude of the change is related to the magnitude of the force. In one or more embodiments, a processing system (not shown) may obtain force information for input objects in the sensing region (205) based on resulting signals obtained from the force receiver electrodes (225).

In one or more embodiments, the shield conductive material (215) is configured to protect the force receiver electrodes (225) from various electrical effects of an input object in the sensing region (205). For example, proximity of an input object to the force receiver electrodes (225) may alter the variable capacitance formed between the force receiver electrodes (225) and some of the proximity sensor electrodes (245). As such, the shield conductive material (215) may at least partially attenuate effects of the input object on the force receiver electrodes (225). Furthermore, the shield conductive material (215) may eliminate capacitive effects contributed by the input object to various areas of capacitance formed between the force receiver electrodes (225) and various proximity sensor electrodes (245) of the input device (200).

Figure 2B:
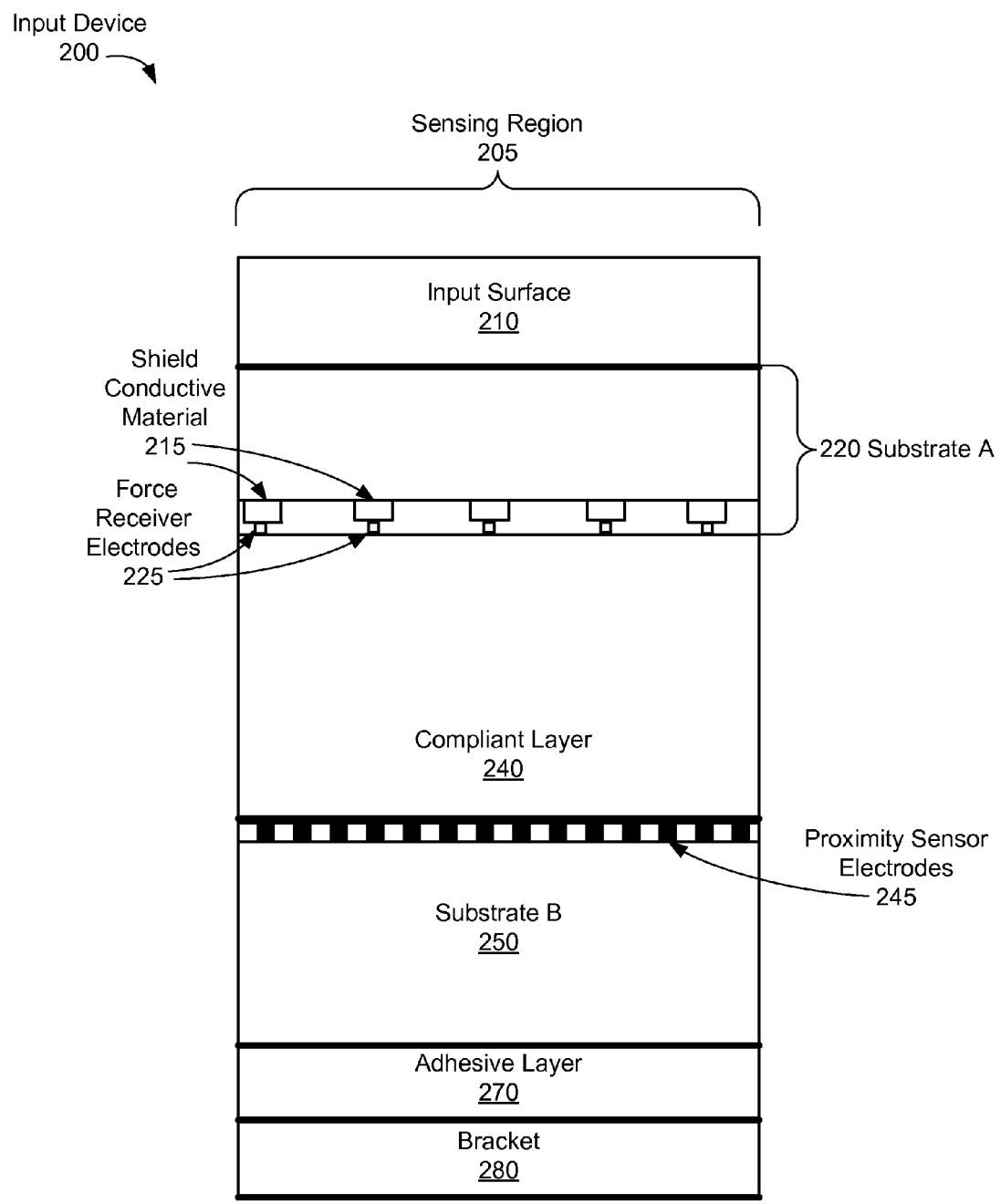
FIG. 2B shows a cross-sectional diagram in accordance with one or more embodiments.

In one or more embodiments, the compliant layer (240) is disposed between substrate A (220) and substrate B (250). The compliant layer (240) may be composed of silicone and may include various components configured to locally deform towards substrate B (250) in response to a force applied by an input object. In one or more embodiments, for example as shown in FIG. 2B, the compliant layer (240) may be a substantially homogenous medium. However, other material types for the compliant layer (240) are contemplated as well.

In one or more embodiments, substrate A (220) is a thin film layer deposited on the compliant layer (240). In one or more embodiments, for example, substrate A (220) is a polyethylene terephthalate (PET) film. As such, in one or more embodiments, the force receiver electrodes (225) and/or the shield conductive material (215) are various printed layers of the PET film. The substrate A (220) may further include a printed layer (also called an "isolation layer") configured to align the shield conductive material (215) and the force receiver electrodes (225) to the raised region array (227).

In one or more embodiments, substrate B (250) is a printed circuit board. In one or more embodiments, for example, the proximity sensor electrodes (245) are located on the topside of the substrate B (250), while various components and/or connectors are located on the backside of the substrate B (250) facing the bracket (280).

In one or more embodiments, the compliant layer (240) includes an array of raised regions (227). In one or more embodiments, for example, the force receiver electrodes (225) are configured to be disposed above various respective peaks of the raised region array (227). In response to substrate A (220) locally deforming toward substrate B (250), for example, the raised region array (227) may deflect the force receiver electrodes (225) towards substrate B (250), while skewing various portions of the compliant layer (240) into various open spaces (e.g., open space A (231), open space B (232)). As such, portions of the compliant layer (240) may displace the open spaces as the raised region array (227) locally deforms. This displacement may change the dielectric between the force receiver electrodes (225) and transmitter electrodes among the proximity sensor electrodes (245), and thus changes the capacitance between the force receiver electrodes (225) and the transmitter electrodes. While the open spaces may be filled with air, in one or more embodiments, the open spaces are filled with various types of elastic substances, such as various gels or foams.

Turning to FIG. 2B, FIG. 2B shows an alternate embodiment of the input device (200) of FIG. 2A. Specifically, as mentioned above, the input device (200) of FIG. 2B comprises a substantially homogeneous compliant layer (240) without the raised regions (227) of the input device of FIG. 2A.

Figure 3:
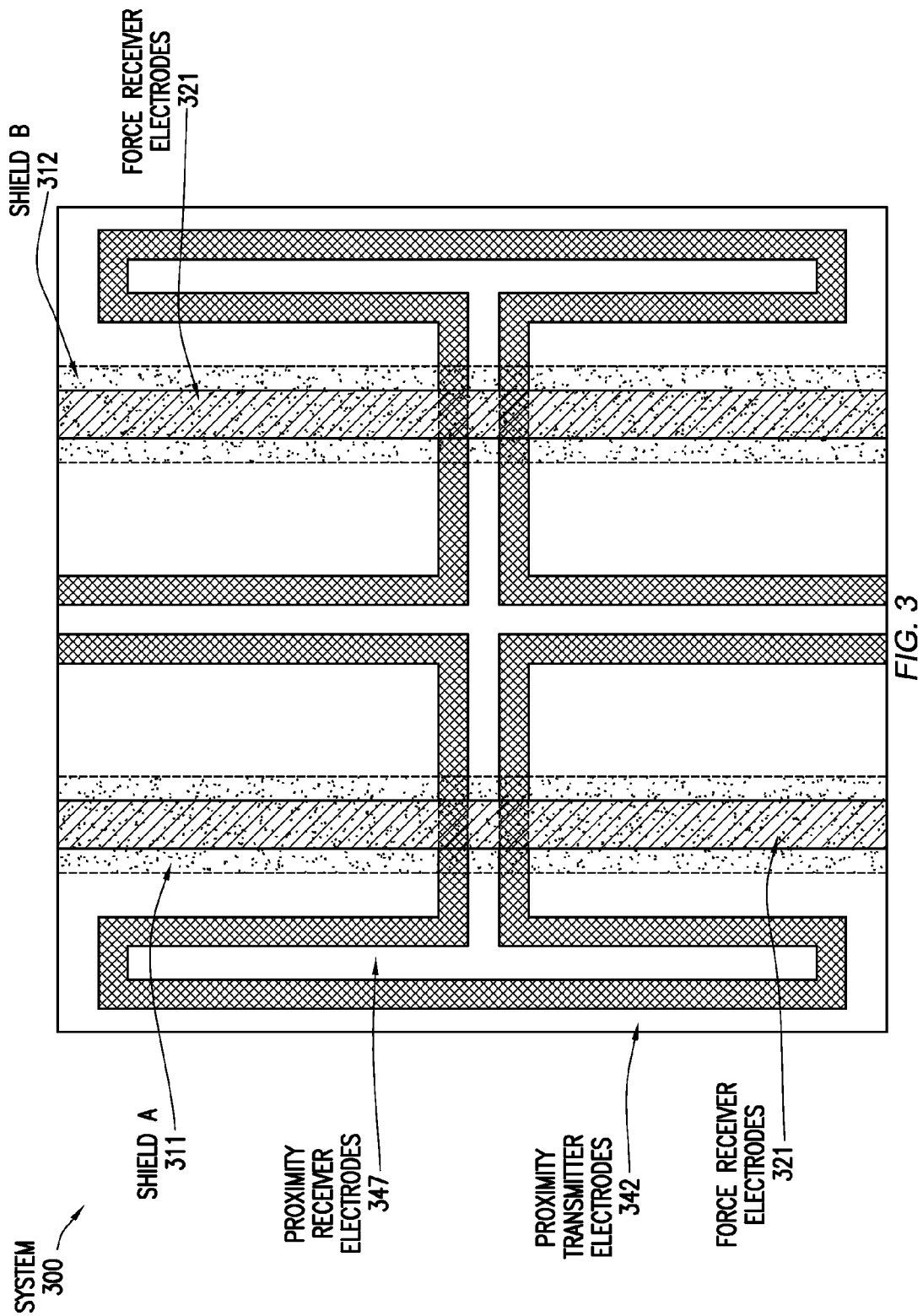
FIG. 3 shows a schematic diagram in accordance with one or more embodiments.

Turning to FIG. 3, FIG. 3 shows a schematic diagram of a system in accordance with one or more embodiments. As shown in FIG. 3, a system (300) may include various shields (e.g., shield A (311), shield B (312)), various proximity receiver electrodes (347), various proximity transmitter electrodes (342), and various force receiver electrodes (321). For example, in one or more embodiments, the proximity receiver electrodes and/or the proximity transmitter electrodes are disposed along one substrate (not shown) and the force receiver electrodes are disposed along a different substrate (not shown).

In one or more embodiments, shield A (311) and/or shield B (312) are conductive material similar to the shield conductive material (215), described above in respect to FIGS. 2A and 2B. In one or more embodiments, for example, shield A (311) and/or shield B (312) are configured to be maintained at substantially constant electric potential while a sensing signal is transmitted on the proximity transmitter electrodes (342) and a resulting signal is received on one of the force receiver electrodes (321). Furthermore, in one or more embodiments, shield A (311) and/or shield B (312) are configured to overlap at least a portion of the force receiver electrodes (321). In other words, the force receiver electrodes (321) are below the shields (311, 312).

In one or more embodiments, the force receiver electrodes (321) and the proximity receiver electrodes (347) are arranged in a predetermined pattern in the system (300). For example, in one or more embodiments, the force receiver electrodes (321) and the proximity receiver electrodes (347) are substantially aligned in the predetermined pattern along different substrates in the system (300). The predetermined pattern may limit the overlap between the proximity receiver electrodes (347) and the force receiver electrodes (321) as shown. As such, the limited overlap may reduce interference between both sets of receiver electrodes, and enable the proximity transmitter electrodes (342) to capacitively couple with both the force receiver electrodes (321) and the proximity receiver electrodes (347). While one predetermined pattern is shown in FIG. 3, other predetermined patterns are contemplated that have more overlap or no overlap between the force receiver electrodes (321) and the proximity receiver electrodes (347).

In one or more embodiments, the proximity receiver electrodes (347) are disposed at a horizontal offset from the force receiver electrodes (321). As such, the system (300) may be configured with a predetermined distance or spacing between the proximity receiver electrodes (347) and the force receiver electrodes (321). Specifically, the predetermined distance may reduce interference between the proximity receiver electrodes (347) and the force receiver electrodes (321).

In one or more embodiments, a processing system (not shown) determines a proximity image from the proximity receiver electrodes (347). For example, the proximity image may describe the presence and location of an input object (not shown) in a sensing region (not shown). As such, the proximity image may represent positional information as touch pixels where respective touch pixels represent the location(s) where the input object is detected in the sensing region. Specifically, touch pixels may correspond to individual coordinates, ranges of coordinates, and/or sets of coordinates within a two-dimensional grid defining the sensing region. In one or more embodiments, the system (300) corresponds to a single touch pixel of the proximity image.

In one or more embodiments, a processing system (not shown) determines a force image from the force receiver electrodes (321). For example, the force image may describe various input forces applied by an input object (not shown) to an input surface (not shown). As such, the force image may represent force information as force pixels (i.e. areas of variable capacitance) describing the location and/or magnitude of various input forces applied to the input surface or other substrate of an input device. In one or more embodiments, the system (300) corresponds to a single force pixel of the force image. In one or more embodiments, a proximity image is aided by the force receiver electrodes (321). As such, if an input force is detected at a particular location, the processing system may determine the input object is also at the same location. In other words, the force receiver electrodes (321) may be used in a dual role to detect both an applied force and a location of an input object.

Figure 4:
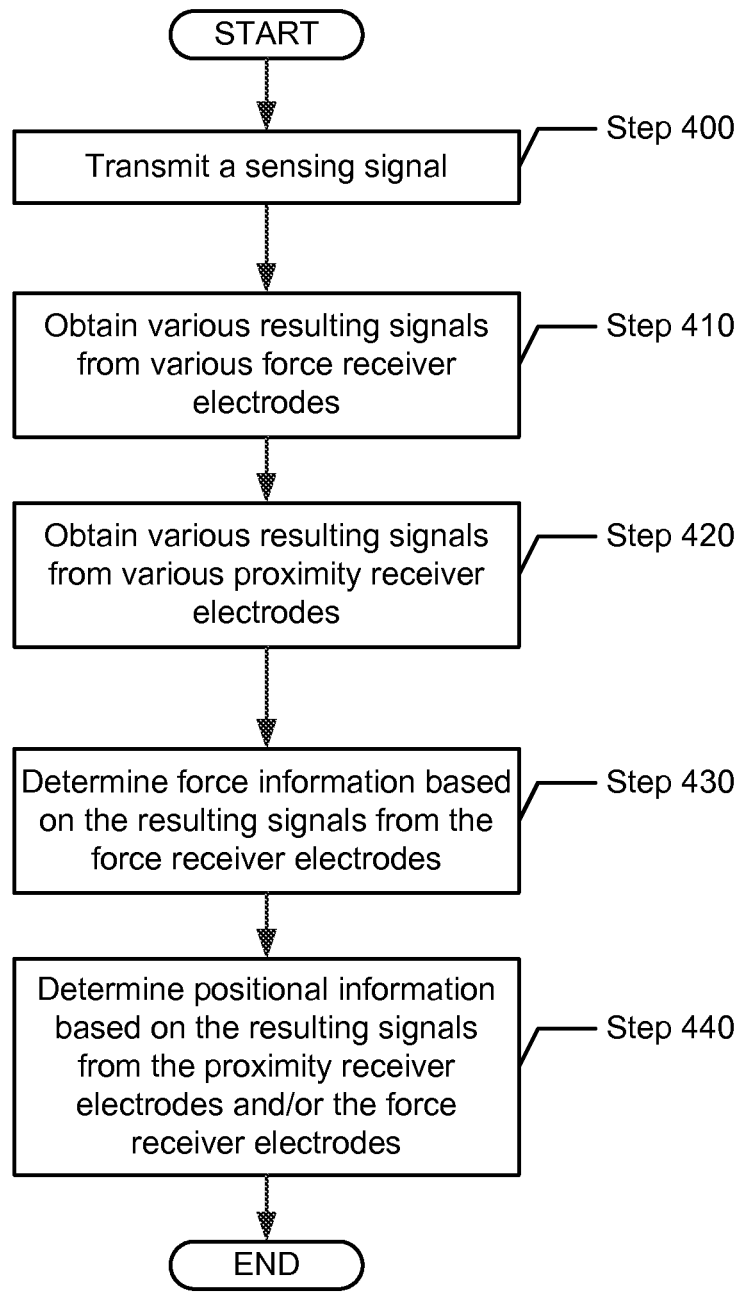
FIG. 4 and FIG. 5 show flowcharts in accordance with one or more embodiments.

Turning to FIG. 4, FIG. 4 shows a flowchart in accordance with one or more embodiments. The process shown in FIG. 4 may involve, for example, one or more components discussed above in reference to FIGS. 1-3 (e.g., processing system (110)). One or more steps shown in FIG. 4 may be omitted, repeated, and/or performed in a different order among different embodiments. Accordingly, embodiments should not be considered limited to the specific number and arrangement of steps shown in FIG. 4.

In Step 400, a sensing signal is transmitted in accordance with one or more embodiments. For example, the sensing signal may be applied to various transmitter electrodes of a plurality of proximity sensor electrodes. For more information on sensing signals (also called "transmitter signals") to transmitter electrodes, see FIG. 1 and the accompanying description.

In Step 410, various resulting signals are obtained from various force receiver electrodes in accordance with one or more embodiments. These resulting signals may be a function of the sensing signal and the capacitance between the force receiver electrodes and the transmitter electrodes. Accordingly, changes to the capacitance between the force receiver electrodes and the transmitter electrodes (e.g., due to the force receiver electrodes deflecting towards the transmitter electrodes, due to changes in the dielectric between the force receiver electrodes and the transmitter electrodes) may also be reflected in the resulting signals. The various resulting signals may be received at a sensing module. For more information on resulting signals from receiver electrodes, see FIG. 1 and the accompanying description.

In Step 420, various resulting signals are obtained from various proximity receiver electrodes in accordance with one or more embodiments. These resulting signals may be a function of the sensing signal and the capacitance between the proximity receiver electrodes and the transmitter electrodes. Accordingly, changes to the capacitance between the proximity receiver electrodes and the transmitter electrodes (e.g., due to the presence of an input object) may also be reflected in the resulting signals. Similar to Step 410, for example, various resulting signals may be received at a sensing module. For more information on resulting signals from receiver electrodes, see FIG. 1 and the accompanying description.

In Step 430, force information is determined based on the resulting signals from the force receiver electrodes in accordance with one or more embodiments. As such, in one or more embodiments, the processing system may determine a force pixel image from the resulting signals in Step 410. For more information on force information and force pixels, see FIG. 1, FIG. 3, and the accompanying description.

In Step 440, positional information is determined based on the resulting signals from the proximity receiver electrodes and/or the force receiver electrodes in accordance with one or more embodiments. In one or more embodiments, for example, a processing system receives resulting signals from one or more systems similar to the system shown in FIG. 3. As such, in one or more embodiments, the processing system may determine a touch pixel image from the resulting signals in Step 420. In one or more embodiments, the processing system determines the touch pixel image using force information acquired from resulting signals from various force receiver electrodes. Specifically, by determining the location of various forces applied by an input object, the processing system may determine the location of the input object. For more information on positional information and touch pixels, see FIG. 1, FIG. 3, and the accompanying description.

Figure 5:
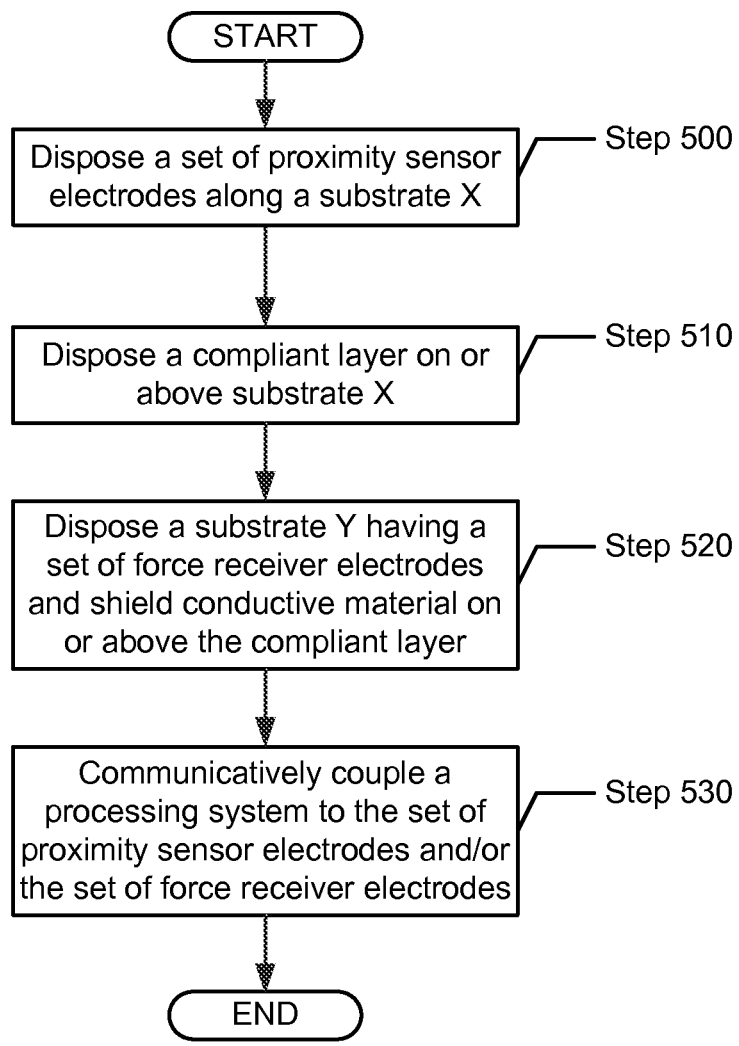

Turning to FIG. 5, FIG. 5 shows a method for manufacturing an input device in accordance with one or more embodiments. In Step 500, a set of proximity sensor electrodes are disposed along a substrate X in accordance with one or more embodiments. In one or more embodiments, for example, the substrate X is a printed circuit board. Further, various subsets of the proximity sensor electrodes may include receiver electrodes and transmitter electrodes as described in FIGS. 1-3 and the accompanying description.

In Step 510, a compliant layer is disposed on or above the substrate X in accordance with one or more embodiments. In one or more embodiments, for example, the compliant layer is the compliant layer as described in FIGS. 2A and 2B, and the accompanying description.

In Step 520, a substrate Y having a set of force receiver electrodes and various shield conductive material is disposed on or above the compliant layer in accordance with one or more embodiments. In one or more embodiments, for example, the substrate Y is a thin film layer, such as polyethylene terephthalate (PET) film. The thin film layer may include shield conductive material and/or various force receiver electrodes. In one or more embodiments, the substrate Y includes an isolation layer that aligns a respective force receiver from the set of force receiver electrodes to a respective raised region of the compliant layer.

In Step 530, a processing system is communicatively coupled to the set of proximity sensor electrodes and/or the set of force receiver electrodes in accordance with one or more embodiments. In one or more embodiments, the processing system is configured to perform the various operations described with respect to FIG. 4 and the accompanying description. In one or more embodiments, the processing system is the processing system described with respect to FIG. 1 and the accompanying description.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. An input device, comprising:
   an input surface;
   a first substrate coupled to the input surface, the first substrate comprising a plurality of force receiver electrodes configured to detect an input force applied by an input object to the input surface;
   a conductive material disposed between the input surface and the plurality of force receiver electrodes, wherein the conductive material shields the plurality of force receiver electrodes from effects of the input object in a sensing region of the input device, wherein the conductive material is aligned with a predetermined pattern of the plurality of force receiver electrodes;
   a second substrate coupled to the first substrate, the second substrate comprising a plurality of transmitter electrodes and a plurality of proximity receiver electrodes configured to detect a location of the input object at the input surface; and
   a compliant component disposed between the first substrate and the second substrate,
   wherein the compliant component comprises an array of raised regions, and
   wherein the plurality of force receiver electrodes are aligned with respective peaks of the array of raised regions.

2. The input device of claim 1,
   wherein the plurality of transmitter electrodes and the plurality of force receiver electrodes are configured to capacitively couple and form a plurality of areas of variable capacitance.

3. The input device of claim 1,
   wherein the conductive material is disposed on the first substrate,
   wherein the plurality of proximity receiver electrodes are configured to receive a resulting signal comprising effects of input objects in the sensing region, and
   wherein the conductive material is configured to be maintained at a substantially constant electric potential while the sensing signal is transmitted through the plurality of transmitter electrodes.

4. The input device of claim 3,
   wherein the plurality of force receiver electrodes and the plurality of proximity receiver electrodes are substantially aligned in a pattern along the first substrate and the second substrate to form a touch pixel.

5. The input device of claim 1,
   wherein the plurality of transmitter electrodes is disposed at a horizontal offset in the second substrate from the plurality of proximity receiver electrodes.

6. The input device of claim 1,
   wherein the conductive material overlaps the plurality of force receiver electrodes.

7. The input device of claim 1, further comprising:
   wherein, in response to the input force being applied to the input surface, the first substrate is configured to deflect the plurality of force receiver electrodes toward the second substrate, and
   wherein the compliant component, the first substrate and the input surface are configured to locally deform in response to the input force.

8. The input device of claim 1,
   wherein the compliant component comprises a substantially homogenous foam medium.

9. The input device of claim 1,
   wherein the first substrate comprises polyethylene terephthalate (PET), and
   wherein the second substrate comprises a printed circuit board.

10. The input device of claim 1,
    further comprising a processing system communicatively coupled to the plurality of force receiver electrodes, the plurality of transmitter electrodes, and the plurality of proximity receiver electrodes, the processing system comprising:
    a determination module configured for processing a first resulting signal and a second resulting signal,
    wherein the first resulting signal is based on a change in a first variable capacitance formed between the plurality of force receiver electrodes and the plurality of transmitter electrodes, and
    wherein the second resulting signal is based on a change in a second variable capacitance formed between the plurality of transmitter electrodes and the plurality of proximity receiver electrodes.

11. A processing system for an input device, the processing system comprising:
    a sensor module configured to:
        receive a first resulting signal associated with a plurality of force receiver electrodes in a first substrate; and
        receive a second resulting signal associated with a plurality of proximity receiver electrodes; and
    a determination module configured to:
        determine force information applied by an input object to an input surface based on the first resulting signal, the first resulting signal based on a change in a first variable capacitance formed between the plurality of transmitter electrodes and the plurality of force receiver electrodes; and
        determine positional information of the input object in a sensing region of the input device based on a second resulting signal, the second resulting signal based on a change in a second variable capacitance formed between the plurality of transmitter electrodes and the plurality of proximity receiver electrodes,
    wherein the input device further comprises a conductive material disposed between the input surface and the plurality of force receiver electrodes,
    wherein the conductive material is aligned with a predetermined pattern of the plurality of force receiver electrodes,
    wherein the input device further comprises a compliant component disposed between the first substrate and the second substrate and configured to locally deform in response to a force applied to the input surface,
    wherein the compliant component comprises an array of raised regions, and
    wherein the plurality of force receiver electrodes are aligned with respective peaks of the array of raised regions.

12. The processing system of claim 11,
    wherein the first variable capacitance changes in response to a force applied to the input surface and deflection of the plurality of force receiver electrodes towards the plurality of transmitter electrodes.

13. The processing system of claim 11,
    wherein the compliant component comprises a substantially homogenous foam medium.

14. A method for manufacturing an input device, comprising:
    providing a first substrate, the first substrate comprising a plurality of proximity receiver electrodes and a plurality of transmitter electrodes;
    disposing a second substrate on or above the first substrate, the second substrate comprising a plurality of force receiver electrodes and a conductive material, wherein the conductive material is aligned with a predetermined pattern of the plurality of force receiver electrodes;
    disposing an input surface on or above the second substrate; and
    disposing a compliant component between the first substrate and the second substrate,
    wherein the compliant component is configured to locally deform in response to the input force applied to the input surface,
    wherein the compliant component comprises an array of raised regions,
    wherein the plurality of force receiver electrodes are aligned with respective peaks of the array of raised regions,
    wherein the plurality of proximity receiver electrodes are configured to detect a location of an input object at the input surface,
    wherein the plurality of force receiver electrodes are configured to detect an input force applied by the input object to the input surface, and
    wherein the conductive material shields the plurality of force receiver electrodes from effects of the input object on or above the input surface.

15. The method of claim 14, further comprising:
    communicatively coupling a processing system to the plurality of proximity receiver electrodes, the plurality of transmitter electrodes, and the plurality of force receiver electrodes, the processing system comprising a determination module configured for processing a first resulting signal and a second resulting signal,
    wherein the first resulting signal is based on a change in a first variable capacitance formed between the plurality of proximity receiver electrodes and the plurality of transmitter electrodes, and
    wherein the second resulting signal is based on a change in a second variable capacitance formed between the plurality of proximity receiver electrodes and the plurality of transmitter electrodes.

16. The method of claim 14, further comprising:
    wherein the compliant component comprises a substantially homogenous foam medium.

* * * * *